United States Patent [19]

Sessa

[11] 4,137,556
[45] Jan. 30, 1979

[54] PROTECTION CIRCUIT FOR A DATA TRANSMISSION SYSTEM

[75] Inventor: Conio Sessa, Fairfield, Conn.

[73] Assignee: Alpex Computer Corporation, Danbury, Conn.

[21] Appl. No.: 830,059

[22] Filed: Sep. 2, 1977

[51] Int. Cl.$^2$ ............................................. H02H 3/20
[52] U.S. Cl. ...................................... 361/91; 307/358; 325/150; 361/58; 361/59; 361/111
[58] Field of Search .................. 361/91, 88, 89, 90, 361/86, 87, 93, 94, 59, 71, 58, 110, 111; 307/130, 356, 358, 362; 325/150, 362; 328/146, 135; 340/248 A, 248 C

[56] References Cited

U.S. PATENT DOCUMENTS

| | | | |
|---|---|---|---|
| 3,513,353 | 5/1970 | Lansch | 361/91 |
| 3,870,899 | 3/1975 | Stoffer | 361/91 X |
| 3,870,957 | 3/1975 | Straw | 361/91 X |
| 3,959,694 | 5/1976 | Walsh | 361/91 |
| 4,009,419 | 2/1977 | Ligman | 361/91 |

*Primary Examiner*—Patrick R. Salce
*Attorney, Agent, or Firm*—Darby & Darby

[57] ABSTRACT

A bi-directional data transmission system in which the magnitude of the data signals transmitted from a data device is monitored and data transmission to and from the data device is interrupted when the magnitude of the signal exceeds a pre-selected level is disclosed. The system includes a protective network coupling a data device and a data transmission circuit. The protective network includes a conductor providing a path for data signals which enter and leave the data device via the transmission circuit. A control circuit is positioned in the data path for receiving the data signals entering and leaving the data device via the transmission circuit and for providing a binary control signal which is dependent solely on the magnitude of the data signal leaving the data device. The system further includes a switch controlled by the binary control signal for completing the data carrying path provided by the conductor when the magnitude of the data signal leaving the data device is less than a pre-selected level and for interrupting the data carrying path when the data signal leaving the data device is greater than a pre-selected level. The system also includes a load simulator which is incorporated into the network by the switch when the switch interrupts the data path thereby enabling the control circuit to continually sample the data signal leaving the data device and provide the control signal.

11 Claims, 2 Drawing Figures

PROTECTION CIRCUIT FOR A DATA TRANSMISSION SYSTEM

BACKGROUND OF THE INVENTION

This invention relates to protective networks for data transmission systems and more particularly to such a protective network which prevents the transmission of data signals between a data device and a data transmission circuit when the magnitude of the data signals leaving the data device exceed a pre-selected level.

Data transmission systems are well known in the art. Frequently, such systems take the form of a data device such as a computer transmitting and receiving data over a data transmission circuit such as, for example, telephone lines. Due to requirements imposed by the operators of the telephone lines, such systems frequently include protective networks coupling the computers with the telephone lines, the purpose of such protective networks being to prevent damage to the telephone lines by excessively large signals leaving the computer. Conventional protective networks are, in many ways, less than completely satisfactory. Frequently, such protective networks include attenuating circuits which act to lessen the magnitude of the computer emanated data signals reaching the telephone lines when such signals exceed a predetermined level. It will be understood, however, that the magnitude of the data signals leaving the computer is usually adjustable and, therefore, when the magnitude of the data signals leaving the computer exceeds a desired level it is an indication of a malfunction or error in the system. It is therefore obvious that merely attenuating the data signals emitted by the computer and permitting the continuation of transmission may cause unanticipated difficulties. A further difficulty arises from the fact that these systems are usually bidirectional, that is, data signals are being carried from the computer to the telephone lines and simultaneously, data signals are being carried by the telephone lines to the computer. The aforementioned protective networks customarily respond to the total signal magnitude in the transmission path and this includes the sum of the data signals leaving the data device and the data signals entering the data device. It is thus seen that the conventional attenuating protective network may act to attenuate the data signals emitted by the computer even when such signals have a magnitude well below their maximum allowable level in the event that the data signals being transmitted to the computer over the telephone lines (including noise) exceed an anticipated level.

SUMMARY OF THE INVENTION

It is, therefore, an important object of the present invention to provide a data transmission system by means of which the aforesaid drawbacks and disadvantages may be most efficaciously avoided.

It is a further object of this invention to provide a protective network for a data transmission system which interrupts the transmission of data in the system when the magnitude of the data signals transmitted in a selected direction exceed a predetermined level.

It is still another object of this invention to provide a protective network for a data transmission system which measures the magnitude of data signals being transmitted in a selected direction independently of the continuity of the data transmission path.

Generally speaking, the objectives of the present invention are attained by the provision of a data transmission system including a protective network coupling a data device and a data transmission circuit, the protective network comprising path providing conducting means adapted to carry data signals entering and leaving the data device via the transmission circuit, control means in the data path for receiving the data signals carried by the conducting means and providing a control signal dependent on the magnitude of the data signal leaving the data device and switching means responsive to the control signal for completing or interrupting the data path, the state of the switching means being dependent on the magnitude of the data signal leaving the data device.

BRIEF DESCRIPTION OF THE DRAWINGS

The foregoing and other objects and features of the present invention will be more clearly understood from the following detailed description thereof when read in conjunction with the accompanying drawings in which.

DESCRIPTION OF THE PREFERRED EMBODIMENT

Figure 1:
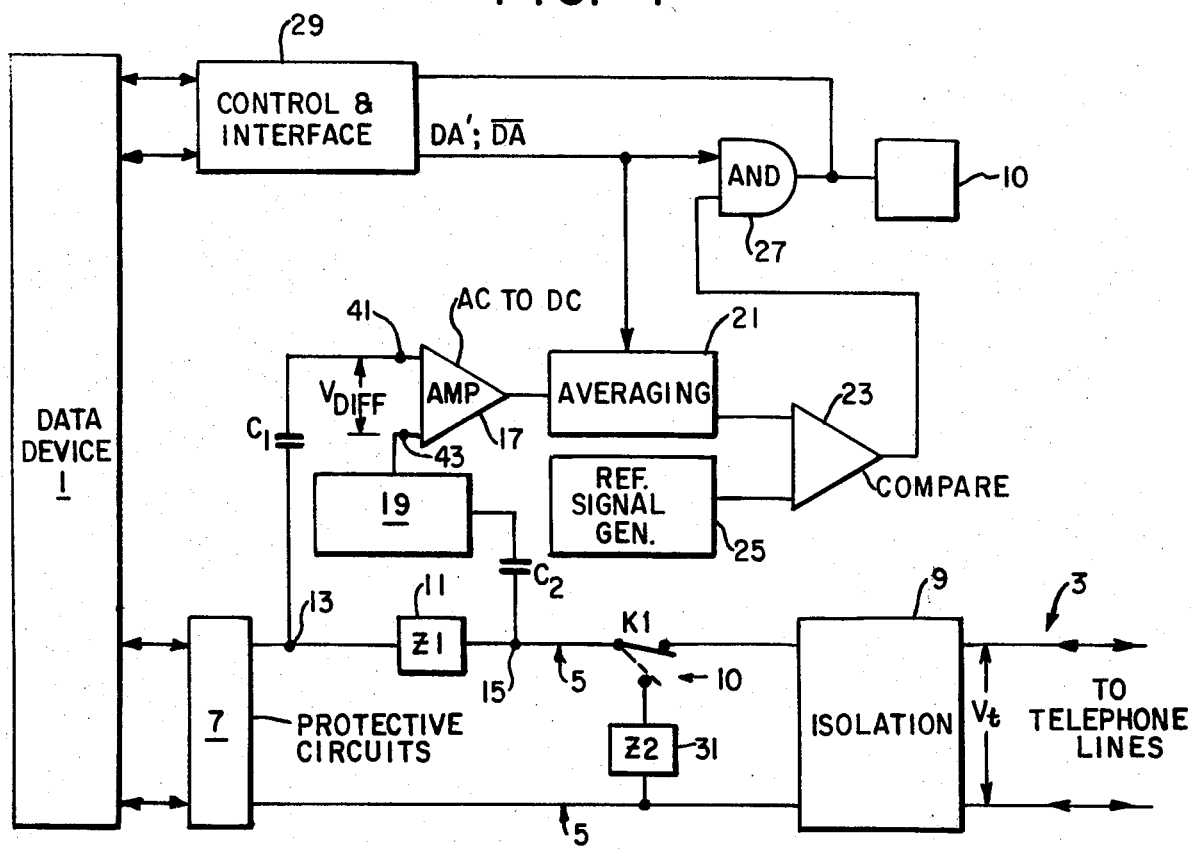
FIG. 1 is a block diagram of a data transmission system according to the invention.

Referring now to FIG. 1 there is illustrated a block diagram of the inventive data transmission system. The system includes a data device 1 which may be, for example, a computer. The data device, which processes information, transmits such information in the form of data signals over a data transmission circuit, indicated generally at 3, which may be conventional telephone lines. The data device 1 also receives information in the form of data signals from the data transmission circuit 3. In operation, data signals are emitted from data device 1 and are carried on the data path provided by conductors 5 to the telephone lines 3. The data signals are routed through a protective circuit 7 which is connected in the data path, the circuit 7 serving to prevent power surges, which may be caused by computer malfunctions, from being transmitted to the transmission circuit 3. The data signals are also routed through an isolation network 9 which is connected in the data path, the network 9 being, in essence, an impedance matching network. The network 9 also serves to prevent power surges, which may be caused by natural phenomena such as lightning, from being transmitted over the telephone lines 3 to the data device 1. It will be understood, of course, that with regard to data signal transmission, the functions of the circuit 7 and the network 9 are the same with respect to data signals emitted by the data device 1 and with respect to data signals transmitted to the computer 1 over the telephone lines 3.

Conventionally, the magnitude of the data signals emitted by the data device or computer 1 is set to a level such that no damage to the telephone lines 3 will result. In the same manner the magnitude of the data signals transmitted to the computer 1 over the telephone lines 3 is also set to a level such that the data device 1 will not be damaged. It is, of course, possible, however, that a malfunction in the data device will cause the data signals transmitted therefrom to exceed a predetermined level. For this reason a protective network is provided to interrupt the data path 5 and thereby avoids damage to the telephone lines 3. Further, the protective network is so designed that it will continue to monitor or sample the magnitude of the output data signal from the computer 1 so as to determine when it is permissible to reconnect or complete the data transmission path provided by the conductors 5.

Turning now to the remainder of the system illustrated in FIG. 1, the operation of the protective network will be described. When the switch 10 is in the position indicated by a solid line, the data signals entering and leaving the computer 1 via the telephone lines 3 pass through a sampling unit $Z_1$ indicated at 11 which is essentially an impedance circuit. The magnitude of the signal appearing across the sampling unit 11, that is, the voltage drop between the terminals indicated at 13 and 15, is a function both of the data signals being transmitted by the computer 1 to the telephone lines 3 and the data signals being transmitted from the telephone lines 3 to the computer 1. Coupled to the terminals 13 and 15 by capacitors $C_1$ and $C_2$ is a difference means or differential amplifier 17 which is arranged as an a.c. to d.c. converter. Connected between one of the input terminals of the differential amplifier 17 and the terminal 15 (via capacitor $C_2$) is a balancing circuit 19, which balancing circuit is essentially a voltage divider. The purpose of the capacitors $C_1$ and $C_2$ is to eliminate any d.c. component from the input signal to the differential amplifier 17, and the purpose of the balancing circuit 19 is to eliminate, from the input of the amplifier 17, any signal differential due to the data signals which enter the data device 1 from the telephone lines 3. For this reason, the impedances of the balancing circuit 19 are selected so that the data signals entering the data device 1 via the telephone lines 3 appear at the inputs to the differential amplifier 17 in "common mode," that is, the magnitudes of the data signals at the two inputs to the differential amplifier 17 are equal and thus the magnitude of the d.c. output from the differential amplifier 17 is due solely to the magnitude of the data signals leaving the data device 1 via the telephone lines 3. Connected to the output of the amplifier 17 is a power averaging circuit 21 which may be in essence, no more than a simple RC charging circuit. The purpose of the averaging circuit 21 is to eliminate the effect of minor variations in the amplitude of the data signals transmitted by the data device 1 which may have a magnitude exceeding that permitted but which last only a short period of time. The use of averaging circuit 21 permits the transmission of relatively short duration data signals even if the signals exceed an allowable magnitude because the total power carried by the transmission lines 3 will not exceed an acceptable, non-damaging level. A comparator circuit 23 is connected to the output of the averaging circuit 21. Also connected to an input of the comparator circuit 23 is the output of a controllable reference signal generator 25 which provides a signal having a predetermined magnitude. The comparator circuit 23 is arranged to have a logic 1 output when the magnitude of the reference signal exceeds the magnitude of the output signal from the averaging circuit 21. In such event it is known that the magnitude of the data signals transmitted by the computer 1 does not exceed the pre-selected level and that it is therefore permissible to transmit the data signals from the data device 1 over the transmission lines 3. An AND gate 27 is connected to the output of the comparator 23. The data device 1 provides another logic input to the AND gate 27 via a control and interface unit 29 (which may be considered part of the computer 1), and this signal is indicated as DA'. The signal DA' as conventionally used is a logic 1 when the transmission line 3 has been captured and the data device 1 is prepared to transmit and receive data signals. When the inputs at the AND gate 27 are both logic 1 the switch 10 is activated, this condition being indicated by the solid line position of the contact arm of the switch 10, thereby permitting the transmission of data both to and from the data device 1 via the transmission line 3.

In the event that the magnitude of the data signals being transmitted by the data device 1 is excessive, then the output signal from the differential amplifier 17 will, over a period of time, cause the output signal from the averaging circuit 21 to have a magnitude exceeding that of the signal provided by the reference generator 25. This will result in a logic "0" output signal from the comparator circuit 23 and a logic "0" applied to the AND gate 27 will result in the deactivation of relay or switch 10 (this condition of the relay being indicated by dashed lines). Deactivation of the relay 10 interrupts the conducting path 5 thereby preventing data signals from entering or leaving the data device via the transmission lines 3. It is desirable, however, that the magnitude of the data signals transmitted by the data device 1 continue to be sampled or monitored so that relay 10 can be reactivated, completing the path 5, when the magnitude of the data signals from the data device 1 is again below a permissible level. For this purpose, an impedance device $Z_2$, having an impedance corresponding to that of the isolation network 9, is positioned between the conductors 5 and is connected into the circuit by the deactivation of the relay 10, the impedance device $Z_2$ being indicated at 31. It will therefore be seen that the magnitude of the signals from the data device 1 are continually being sampled, regardless of the condition of the relay 10, and that the fact that no data signals are entering the data device from the transmission lines 3 when the conducting path 5 is interrupted is of no consequence since the magnitude of these signals is not, in any event, taken into account in determining the appropriate condition of the relay 10.

It is appropriate to note at this point that the output of the AND gate 27 (a logic 1 when data transmission is permitted) is returned to the data device (via the control and interface unit 29) thereby advising the device as to the condition of the switch 10 and as to whether the device may transmit data. It will also be noted that the output of the control and interface unit 29 is connected to the averaging circuit 21 as well as to an input of the AND gate 27. The purpose of the former connection is to permit a signal, indicated as DA, to be provided to the RC averaging circuit 21 to discharge the capacitor, thereby minimizing the time required for the output of the comparator to become a logic "1" in the event that the magnitude of the data signals transmitted by the computer 1 is of a level permissible for transmission over the telephone lines 3. One condition under which the signal DA can be a logic "1" is when the switch 10 goes to its deactivated condition while DA' is a logic "1" due to a logic "0" output from the comparator 23, this latter information being provided to the data device 1 by means of the aforementioned feedback connection from the AND gate 27. In such event DA may be generated by, for example, a manual operation, or, if desired, can be periodically generated by the data device. In any event, it will be understood that provision of DA permits a more rapid return to a condition of data transmission than would be the case if it were necessary to permit the RC averaging circuit to discharge the voltage stored during the discharge time-constant of the RC circuit.

Figure 2:
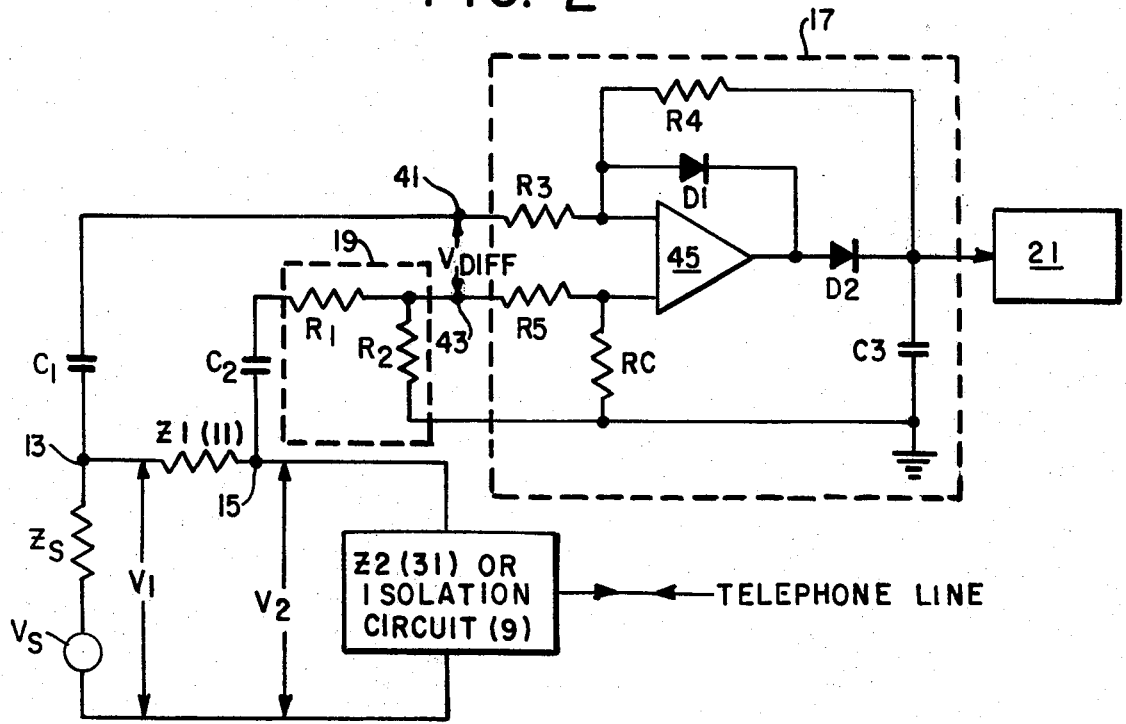
FIG. 2 is a schematic diagram of a protective network according to the invention.

Turning now to FIG. 2, there is illustrated, in detail, the circuitry of the protective network of the instant invention which is used to measure the amplitude of the data signals transmitted by the data device 1. Inasmuch as the function of the various portions of the network have been discussed above with respect to FIG. 1, the operation and structure illustrated here will be only briefly discussed. The source of the data signals transmitted by the data device 1 is indicated at $V_s$ and the internal impedance of the source $V_s$ is indicated at $Z_s$. The magnitude of both the signal at terminal 13, indicated at $V_1$, and the magnitude of the signal at terminal 15, indicated as $V_2$, are related to the magnitudes of the data signals transmitted to the data device 1 over the telephone lines 3 (indicated as $V_t$) and the data signals transmitted by the data device 1 ($V_s$). As previously indicated, it is desired that the difference in voltage ($V_{Diff}$) between the two input terminals of the differential amplifier 17, which terminals are indicated at 41 and 43, be independent of the data signals transmitted to the data device. To this end the protective network is structured so that the magnitude of the signal at terminal 41 due to $V_t$ is equal to the magnitude of the signal at terminal 43 due to $V_t$. As will readily be seen, the voltage at the terminal 41 due to $V_t$ is a function of the ratio $Z_s/Z_s + Z_1$ and the voltage at the terminal 43 due to $V_t$ is a function of the ratio $R_2/R_1 + R_2$. Adjusting $R_1$ and $R_2$ so that $R_2/R_1 + R_2$ is equal to $Z_s/Z_s + Z_1$ will therefore result in the signals at the input terminals 41 and 43 which are due to the data signals entering the data device on the telephone lines being equal and $V_{Diff}$ due to these data signals will be zero. The amplifier 17 is illustrated in FIG. 2 as including the resistors $R_3$, $R_4$, $R_5$ and $R_6$, which are of course selected to provide the amplifier with a desired amplification factor. The diodes $D_1$ and $D_2$ are provided so that, in cooperation with the capacitor, the operational amplifier indicated at 45 is arranged to convert a.c. to d.c., thereby providing the a.c. to d.c. converting differential amplifier 17.

It is thus seen that the output of the differential amplifier 17 will be a d.c. signal having a magnitude which is proportional to the data signals transmitted from the data device 1.

It may therefore be seen that there has been provided a protective network for a data transmission system carrying data signals to and from a data device via transmission lines which protective network will interrupt the data carrying path in the event that the data signals being transmitted from the data device exceed a predetermined magnitude. Moreover, there has been provided a protective network which continually monitors the magnitude of the data signals transmitted from the data device whether or not the data carrying path is continuous.

It will be understood that the foregoing description of the preferred embodiment of the present invention is for purposes of illustration only and that the various structural and operational features as herein disclosed are susceptible to a number of modifications and changes, none of which entail any departure from the spirit and scope of the present invention as defined in the hereto appended claims.

What is claimed is:

1. In a data transmission system a protective network coupling a data device and a data transmission circuit, said protective network comprising:
   conductive means providing a path adapted to carry data signals simultaneously entering and leaving said device via said transmission circuit;
   control means in said data path for receiving the data signals carried by said conducting means and providing a control signal dependent on the magnitude of the data signal leaving said data device and independent of the data signal entering said data device; and
   switching means responsive to said control signal for selectively interrupting said data path.

2. A data transmission system according to claim 1 wherein said switching means completes said data path when said magnitude is less than a pre-selected level and interrupts said data path when said magnitude exceeds said pre-selected level.

3. A data transmission system according to claim 1 wherein said control signal is a binary signal.

4. A data transmission system according to claim 1 wherein said control means comprises:
   a sampling unit having first and second terminals, the magnitude of the signals at each of said first and second terminals being proportional to the magnitude of the data signals carried by said conducting means, said data signals carried by said conducting means including a first signal component proportional to the magnitude of said data signal leaving said data device and a second signal component proportional to the magnitude of said data signal entering said data device; and
   difference means having first and second terminals coupled, respectively, to said first and second sampling unit terminals for providing an output signal proportional to the difference in magnitudes of said first signal component at said first and second sampling unit terminals.

5. A data transmission system according to claim 4 wherein said control means further comprises balancing means connected between said sampling unit and said difference means for providing a signal component of equal magnitude at each of said first and second terminals of said difference means, said equal magnitude signal components being proportional to said second signal component.

6. A data device according to claim 5 wherein said balancing means comprises an impedance circuit arranged so that the magnitude of the signals at the first and second difference means terminals due to the data signal entering said data device are equal.

7. A data transmission system according to claim 4 wherein said control means further comprises comparator means coupled to said difference means for comparing a signal related to the output signal from said difference means with a reference signal having a selected magnitude.

8. A data transmission system according to claim 7 wherein said control means further comprises averaging means connected between said difference means and said comparator means for providing a signal which is a function of the average output signal of said difference means during a pre-selected length of time to said comparator means.

9. A data transmission system according to claim 8 wherein said averaging means comprises charge storing means adapted to receive a charge dissipating signal from said data device for temporarily discharging said storage means, thereby ensuring that the magnitude of said reference signal is, at least temporarily, greater than the magnitude of the output signal of said averaging means.

10. A data transmission system according to claim 2 further comprising simulating means connected to said switching means when said data path is interrupted for enabling said control means to continuously provide said control signals.

11. A data transmission system according to claim 11 wherein said simulating means simulates the impedance of said data transmission circuit.

* * * * *